United States Patent Office 3,377,405
Patented Apr. 9, 1968

3,377,405
PREPARATION OF POLYENES
Edward Hurley, Jr., Littleton, and David W. Hall, Englewood, Colo., assignors to Marathon Oil Company, Findlay, Ohio, a corporation of Ohio
No Drawing. Filed May 31, 1966, Ser. No. 553,632
10 Claims. (Cl. 260—681)

ABSTRACT OF THE DISCLOSURE

Isoprene or other polyene is prepared by heating the meta-dioxane in a solvent medium catalyzed with a reaction product of an acid and a weakly basic nitrogen compound such as dimethylformamide.

---

The present invention relates to a method of preparing polyenes, particularly conjugated di-olefins, by the cleavage of 1,3-dioxanes.

A number of methods heretofore have been proposed for preparing polyenes, especially isoprene, from 1,3-dioxanes. While certain of these methods has been used commercially, they have, generally speaking, one or more significant disadvantages, notably from the standpoint of the relatively high temperature conditions required to obtain the end product, the number and types of agents utilized, and the low yields realized.

In accordance with the present invention there is provided a method of preparing polyenes from 1,3-dioxanes which overcomes various of the aforementioned disadvantages of prior art methods. The method of this invention is carried out at comparatively low temperatures using simple, easy-to-handle raw materials. The polyenes, including the commercially important diene, isoprene, are obtained in high purity in excellent yields.

Briefly, the method of the present invention involves heating, at relatively low temperatures, a 1,3-dioxane in a solvent medium which contains a small amount of an acid salt or complex of a weakly basic nitrogen-containing compound. Cleavage of the dioxane proceeds readily and the resulting polyene is withdrawn from the reaction zone by conventional procedures. By-products, principally in the form of formaldehyde and water, can be separated from the solvent medium, and the solvent re-used.

While the method of this invention has special and unique applicability to the preparation of isoprene from 4,4-dimethyl-m-dioxane, it has general use in the preparation of a wide group of polyenes, including branched chain di-olefins and tri-olefins, from 1,3-dioxanes or mixtures thereof. Thus, by way of illustration, 2,3-dimethyl-1,3-butadiene can be prepared in accordance with the practice of this invention from 4,4,5-trimethyl-m-dioxane; 3-methyl-1,3-pentadiene from 4,5,6-trimethyl-m-dioxane; and 2-methyl-1,3-pentadiene from 4,4,6-trimethyl-m-dioxane.

The 1,3-dioxanes used in carrying out the method of this invention can be obtained from commercial sources, or they can be prepared by any of a number of known procedures. The 1,3-dioxane, 4,4-dimethyl-m-dioxane, used in the present invention to obtain isoprene, for instance, can be prepared by reacting a formaldehyde donor, such as paraformaldehyde, with tertiary butyl alcohol in the presence of sulfuric acid. The same 1,3-dioxane also can be obtained from the reaction of depolymerized formaldehyde with isobutylene using an acid catalyst.

The objectives of the present invention are met by carrying out the cleavage of the 1,3-dioxanes in a solvent medium which, as indicated hereinabove, contains a small amount of an acid salt or complex of a weakly basic nitrogen-containing compound. The solvents having utility in the practice of the method are characterized in that they are substantially inert with respect to the 1,3-dioxane and the forming polyene under the temperature conditions employed. In accordance with the particularly preferred practice of the invention, the solvent employed is a weakly basic nitrogen-containing compound, a portion of which is present in the form of an acid salt or complex which is usually partially heat dissociable. The nitrogen-containing compound is substantially inert with respect to the 1,3-dioxane and the polyene formed, but probably forms a salt or complex with an acid which is not dissociable, under the conditions employed in effecting cleavage of the 1,3-dioxane, to the extent that any appreciable quantity of acid addition products of the formed polyene will result.

The foregoing criteria most advantageously are met by nitrogen-containing bases having base constants ($K_b$) in the range of from $10^{-10}$ to about $10^{-18}$, preferably $10^{-12}$ to $10^{-16}$, such as amides, particularly tertiary amides, exemplified by N-methyl-2-pyrrolidone, N-ethyl-2-pyrrolidone, dimethylformamide, and the like. Amides of this type react with acids such, for example, as hydrochloric acid, to form salts. In addition, such amides have vapor pressures which, generally speaking, are higher than that of the formed polyene and, therefore, do not interfere with withdrawal, as by distillation, of the polyene from the reaction zone.

The acid salt or complex can be introduced into the solvent medium in a pre-formed state, or, in accordance with a particularly preferred practice of the invention, especially in those instances where the solvent employed consists essentially of an amide of the type described hereinabove, it can be formed in situ by simply adding a suitable quantity of an acid to the solvent. The acid utilized in forming the acid salt or complex salt should, of course, be capable of providing a salt or complex having the required characteristics for carrying out the method. Exemplary of acids having utility for this purpose are mineral acids such as hydrochloric acid, sulfuric acid, and phosphoric acid; and organic acids having acid constants ($K_a$) of $10^{-4}$ or greater, including paratoluenesulfonic acid, and trichloroacetic acid.

The quantity of acid salt or complex employed in carrying out the method may vary within appreciable limits. Generally speaking, however, the acid salt or complex should comprise, 0.01 to 1.0 and preferably 0.05 to 0.25 equivalent of H+ per mole of nitrogen base sites of the solvent medium.

The proportions of solvent and 1,3-dioxane, or mixtures of 1,3-dioxanes, used also are variable. Practical considerations dictate that only so much of the solvent be used as is needed to effect cleavage of the 1,3-dioxane at the temperatures employed. This objective can be attained with molar ratios of solvent to 1,3-dioxane in the range of from about 1 to about 10, usually about 2 to about 6, of the solvent to about 1 of the 1,3-dioxane, but higher and lower ratios are operable.

The temperatures employed in carrying out the method of this invention can range from about 75° to 175° C., more or less. It is especially desirable, however, to operate at temperatures of the order of from about 100° C. to 160° C., with about 120° to 140° C., being the preferred range.

The time required to effect cleavage of the 1,3-dioxane is variable and will depend, in the main, on the 1,3-dioxane used, the type and quantity of solvent medium, and the temperature employed. Thus, by way of illustration, utilizing 4,4-dimethyl-m-dioxane and a solvent medium comprising N-methyl-2-pyrrolidone containing 4 weight percent of hydrochloric acid, in a ratio of about 1 part of the dioxane to about 5 parts of the solvent medium, excellent yields of isoprene can be obtained at a temperature range of from 100° to 150° C. in from about ¼ to 3 hours.

To assist in recovery of the aldehyde by-product liberated by cleavage of 1,3-dioxane, it is preferred to add to the reaction mixture an alcohol, preferably methanol or ethanol, to react with the aldehyde to form a low boiling formal, e.g. methylal. This alcohol is preferably added slowly during the reaction so that it reacts with the aldehyde as it is formed. The resulting formal can readily be removed by distillation as it is formed. The applicable techniques are more fully disclosed in co-pending application Ser. No. 553,666, filed of even date.

The following specific examples are illustrative of the practice of the present invention.

Example I

To obtain 4,4-dimethyl-m-dioxane, a reaction mixture comprising 400 cc. of 30% aqueous formaldehyde solution, 180 grams of paraformaldehyde, 8 grams of sulfuric acid and 296 grams of t-butyl alcohol is introduced into a 3.7 liter pressure-tight autoclave and mixed for 7 hours at from 80° to 90° C. Potassium carbonate is added to the reaction mixture to separate out the 4,4-dimethyl-m-dioxane formed. The product is purified by vacuum distillation through an 18 inch packed column. By GLC analysis, the product is 91% pure 4,4-dimethyl-m-dioxane.

To a pot containing 218 grams of N-methyl-2-pyrrolidone and 14 grams of anhydrous hydrochloric acid is added 45 grams of the 4,4-dimethyl-m-dioxane obtained as described. The pot is attached to a simple distillation apparatus and heated to 150° C. After 3 hours isoprene is obtained in 77% yield.

Example II

To a pot containing 220 grams of N-methyl-2-pyrrolidone, which has approximately 4 weight percent hydrochloric acid, is added 42.6 grams of 97.4% 4,4-dimethyl-m-dioxane prepared as described in Example I. The procedure outlined in Example I is followed. After 5 hours at 120° C. a high yield of isoprene is obtained.

Example III

To a pot containing 200 grams of N-ethyl-2-pyrrolidone and 10 grams of anhydrous hydrochloric acid is added 30 grams of 4,4,5-trimethyl-m-dioxane. The pot is attached to a simple distillation apparatus as in Example I. The mixture is heated to 160° C. After 4 hours a high yield of 2,3-dimethyl-1,3-butadiene is obtained.

Example IV

To a pot containing 225 grams of dimethylformamide and 15 grams of anhydrous hydrochloric acid is added 45 grams of 4,4-dimethyl-m-dioxane prepared as described in Example I. The pot is connected to a simple distillation apparatus and the mixture is heated to 120° C. After 3 hours a high yield of isoprene is obtained.

Example V

To a pot containing 175 grams of N-methyl-2-pyrrolidone and 8 grams of anhydrous hydrochloric acid is added 35 grams of 4,5,6-trimethyl-m-dioxane. The procedure outlined in Example 3 is followed. After 2 hours a high yield of 3-methyl-1,3-pentadiene is obtained.

Example VI

The procedure outlined in Example V is followed except that 4-methyl-4-vinyl-m-dioxane is used instead of 4,5,6-trimethyl-m-dioxane. After 2 hours a good yield of 2-vinyl-1,3-butadiene is obtained.

Example VII

To a pot containing 210 grams of N-methyl-2-pyrrolidone and 8 grams of sulfuric acid is added 40 grams of 4,4-dimethyl-m-dioxane. The procedure outlined in Example I is followed. After 3 hours a high yield of isoprene is obtained.

Example VIII

The procedure outlined in Example VII is followed except that 15 grams of trichloroacetic acid is substituted for the sulfuric acid. After 3 hours a high yield of isoprene is obtained.

While the foregoing specific examples illustrate the method of the present invention, it is to be understood that the invention is not in any way to be limited thereby.

What is claimed is:

1. A method of preparing polyenes comprising heating a 1,3-dioxane in the presence of the reaction product of an acid and a weakly basic nitrogen-containing compound.

2. A method as claimed in claim 1 wherein the reaction product is derived from an organic base having a $K_b$ of from about $10^{-10}$ to about $10^{-18}$.

3. A method as claimed in claim 1 wherein the nitrogen-containing compound is a tertiary amide.

4. A method as claimed in claim 1 wherein the 1,3-dioxane is heated in the presence of a tertiary amide-hydrochloric acid complex.

5. A method as claimed in claim 3 wherein the tertiary amide is N-methyl-2-pyrrolidone, N-ethyl-pyrrolidone, or dimethylformamide.

6. A method as claimed in claim 1 wherein the temperature at which the 1,3-dioxane is heated is from about 75° to about 175° C.

7. A method as claimed in claim 1 wherein the 1,3-dioxane is heated to a temperature of from about 120° to about 140° C.

8. A method as claimed claim 1 wherein the 1,3-dioxane and the reaction product are heated in a tertiary amide solvent medium.

9. A method as claimed in claim 8 wherein the reaction product comprises from about 0.02 to about 0.25 equivalent of H+ per mole of nitrogen base sites of the solvent media.

10. A method as claimed in claim 1 wherein the 1,3-dioxane is 4,4-dimethyl-m-dioxane.

References Cited

UNITED STATES PATENTS

| | | | |
|---|---|---|---|
| 3,105,857 | 10/1963 | Ackermann | 260—681 |
| 3,235,619 | 2/1966 | Wirth | 260—681 |
| 3,290,403 | 12/1966 | Nemtsov et al. | 260—681 |

DELBERT GANTZ, *Primary Examiner.*

G. E. SCHMITKONS, *Assistant Examiner.*